United States Patent [19]

Rauscher et al.

[11] 3,719,751

[45] March 6, 1973

[54] PESTICIDE AND A PROCESS FOR ITS MANUFACTURE

[76] Inventors: Herbert Rauscher, Im Uhug 54; Werner Schoom, Bergerstrasse 342, both of Frankfurt am Main, Germany

[22] Filed: Feb. 5, 1970

[21] Appl. No.: 9,073

[30] Foreign Application Priority Data

Jan. 22, 1970 Germany....................P 20 02 655.5
Feb. 8, 1969 Germany....................P 19 06 413.2

[52] U.S. Cl. ........................424/27, 21/59, 21/108, 21/129, 43/125, 43/131, 424/128, 424/129
[51] Int. Cl. ..............................................A01m 1/20
[58] Field of Search ....424/27, 40, 128, 129; 43/125, 43/131; 21/59, 108, 129

[56] References Cited

UNITED STATES PATENTS

| | | | |
|---|---|---|---|
| 3,003,911 | 10/1961 | Lindstrom et al. | 162/100 |
| 2,929,761 | 3/1960 | Stevens | 424/40 X |
| 2,519,045 | 8/1950 | Houghton | 424/129 X |
| 2,112,624 | 3/1938 | Houghton | 424/129 X |
| 2,087,368 | 7/1937 | Wilson et al. | 424/129 X |
| 1,991,938 | 2/1935 | Houghton | 424/129 X |
| 1,967,290 | 7/1934 | Cooper | 424/40 X |
| 1,818,136 | 8/1931 | Houghton | 424/129 X |
| 1,704,607 | 3/1929 | Houghton | 424/129 X |
| 1,663,082 | 3/1928 | Houghton | 424/129 X |

FOREIGN PATENTS OR APPLICATIONS

| | | |
|---|---|---|
| 338,408 | 2/1933 | Great Britain |
| 407,792 | 3/1934 | Great Britain |
| 858,592 | 10/1952 | Germany |

*Primary Examiner*—Shep K. Rose
*Attorney*—Gordon W. Hueschen and Talivaldis Cepuritis

[57] ABSTRACT

Pesticidal compositions comprise water-decomposable compounds, adapted to generate toxic gases upon contact with water, held on a porous, fibrous carrier material.

7 Claims, No Drawings

PESTICIDE AND A PROCESS FOR ITS MANUFACTURE

BACKGROUND OF THE INVENTION

The present invention relates to a pesticide from which gaseous, toxic substances can be generated by the action of water or water vapor on finely distributed, decomposable compounds.

It is known to use pesticides in the form of readily decomposable cyanides or alkaline earth phosphides or earth metal phosphides which, under the action of water or water vapor, generate hydrogen cyanide or hydrogen phosphide as gaseous, toxic substances. In practice, difficulties are involved in the use of such products. The gas-generating compounds have to be brought into a form which prevents gas from being generated too rapidly and thus endangering the person using the pesticide or even causing spontaneous combustion due to the localization of heat. Furthermore, this pesticide has to be such that any residues, remaining after the decomposition and generation of the effective substance, can be removed quantitatively, especially if the residues themselves are toxic. To overcome these difficulties, gas-generating compounds such as calcium cyanide, aluminum phosphide, magnesium phosphide or calcium phosphide have been manufactured and used in the form of tablets. Furthermore, such compounds have been coated or mixed with water-repellent substances such as paraffin in order to control the rate at which gas is generated. The residues produced thereby are difficult to collect and remove. A process is also known in which the decomposable, gas-generating compounds are enclosed in paper bags which are permeable to moisture but which repel water, so that the rate at which gas is generated can be controlled indirectly. However, this is disadvantageous in that such bags permanently contain an accumulation of the substances and, in the case of the incomplete generating of gas, the incompletely decomposed residues constitute a latent danger due to their accumulation in the bags, for example if such bags get into animal fodder or are accumulated in large quantities in a separator where they can give rise to fires.

The object of the present invention is to provide a pesticide which generates gas in a controllable manner, which is simple to dispose in the space to be gassed and can be metered in a satisfactory manner, which virtually completely "gasses out," and whose non-powdering residues are subsequently easy to collect and remove.

SUMMARY OF THE INVENTION

The present invention, which relates to the above-mentioned pesticide from which gaseous, toxic substances are generated by the action of water or water vapor on finely distributed, decomposable compounds, is characterized in that the pesticide contains the decomposable compounds together with a porous, shaped fibrous material serving as a carrier.

DESCRIPTION OF THE PREFERRED EMBODIMENTS

The fibrous material contained in the pesticide of the present invention is advantageously in the form of textile fabrics, knitted fabrics, yarns, felts, fleeces, paper, cardboard made from cellulose or materials containing cellulose, glass fibers, slag fibers, asbestos fibers, plastics material fibers, mechanical wood pulp, or two or more of these materials.

Advantageously, the finely distributed, decomposable compounds contained in the pesticide are substances which generate hydrogen phosphide and/or hydrogen cyanide. Such decomposable compounds are primarily calcium cyanide, magnesium phosphide, aluminum phosphide, or mixtures of two or more of these substances. The decomposable compounds should be finely distributed, the diameters of their particles being particularly between 1 and 1,000 microns.

The pesticide can contain up to 70 weight percent of the decomposable compounds.

For many purposes, it is advisable for the pesticide to contain the decomposable compounds mixed with a propellent. Such propellents are primarily ammonium bicarbonate, sodium bicarbonate, ammonium carbamate, or mixtures of two or more of these substances.

To retard the gassing-out of the decomposable compounds, the particles of these compounds may be coated with a water-repellent substance such as synthetic resin, stearine, stearates, or hard paraffin.

In many cases, it is advantageous for the pesticide to contain a binding agent for the fibrous material in order to improve the adhesion of the fibers. Urea may be used as such a binding agent. Alternatively, plastics materials such as polyvinyl chloride, polyurethane, polyester, or polystyrene are good binding agents for this purpose.

If required, the pesticide may also contain a foaming agent such as azodicarbonamide, and/or a softener for the binding agent.

According to the French Patent specification No. 1,531,677, it is known, inter alia, to embed metal phosphides in solid plastics material masses of polyesters, polyurethanes, polyvinyl chloride. However, the pesticides manufactured in this manner "gas out" so slowly that they are unsuitable for practical use. Furthermore, the structure of the plastics material loosens during gassing out, and powdered residues are produced.

The pesticide may also comprise two or more flat structures, such as plates, webs, strips, or the like, which are connected to each other to form a so-called sandwich structure, the outer layers advantageously comprising the fibrous material without the decomposable compounds, since this virtually fully suppresses the powdering of the gassed-out, shaped bodies.

The porous fibrous material provided as an essential constituent of the pesticide serves to allow the atmosphere, and the moisture contained therein, access to the separate particles of the decomposable compounds, so that controlled and virtually complete gassing-out can be effected.

The invention also relates to a process for manufacturing the pesticide described. The process is characterized in that a suspension of the decomposable compounds in an inert, volatile liquid which, if required, contains propellent, a water-repellent substance, a binding agent, a foaming agent, and a softener, is combined with the fibrous material, and the inert volatile liquid is removed by decanting and/or vaporizing. Advantageously, a white spirit, a low aliphatic alcohol, or trichloroethylene may be used as the inert, volatile liquid. Alternatively, a suspension in a liquid, polymerizable mixture, which preferably forms polyesters or polyurethanes during polymerization, may be used instead of the suspension in an inert, volatile liquid.

The process may be such that a preformed fibrous material, such as webs, plates, strips, parallelepipeds, balls, is impregnated or coated with the suspension. If required, the suspension for coating the fibrous material may contain a thickening agent such as finely distributed silicon dioxide (aerosil) or cellulose fibers. Alternatively, however, the fibrous material may be finely distributed into the suspension and the mixture thus obtained then shaped in a manner known per se.

In all cases, it is advisable to dry the fibrous material before treatment, so that any moisture contained therein cannot react prematurely with the decomposable compound. Further, it is advantageous to carry out the process of the invention in an anhydrous environment. When carrying out this process, it must be ensured that all the additives used are anhydrous and do not impair the porosity of the fibrous material.

In accordance with the process of the present invention, pesticides may be manufactured which comprise two or more plates, webs, strips, or the like, which are connected to each other.

The process for manufacturing the pesticides of the present invention may also be carried out continuously. For example, a web of the fibrous material serving as the carrier may be manufactured continuously or drawn from a supply roll, continuously coated or impregnated with the suspension, continuously dried or gelled, arranged in layers with and connected to one or a plurality of similar or different webs if required, the finished end product then being cut into pieces of the desired size, either by being stacked and combined to form packages, or, if required, coiled to form a roll perforated at specific intervals. The finished, shaped pesticide should be stored in air-tight containers from which the desired quantities may be taken as required.

When the pesticide of the present invention is used, gassing-out is effected by atmospheric moisture or, in certain forms of manufacture, water, penetrating through the fibrous material with the decomposition of the gas-generating compound embedded in the mass. The pesticide is loosened up to a certain extent by the gassing-out, although the consistency of the shaped bodies is maintained to the extent where they may readily be quantitatively collected and removed after the gassing operation has been completed. This is particularly simple if the pesticide is produced in the form of plates or webs. Plates may be removed from packaged stacks as required, and collected after gassing-out. Optional lengths of webs may be drawn from rolls and rolled up again after gassing-out.

The pesticides manufactured in accordance with the invention may be used for gassing and disinfecting empty spaces, silos, warehouses and stores for grain, tobacco, cocoa, coffee, or for similar purposes. The gaseous substances generated kill and exterminate insects, rodents, and other pests.

EXAMPLE 1

A suspension of 224 parts by weight of aluminum phosphide having particle diameters between 5 and 600 microns, 50 parts by weight of polyvinyl chloride, and 60 parts by weight of dioctylphthalate was made in 40 parts by weight of white spirit. A fibrous fleece of cellulose having a thickness of 0.2 mm and a weight of 46.5 g/m² was coated on both sides with this suspension to a thickness of 1 to 2 mm. The coated fleece was heated for 20 minutes at 190° C.

When the pesticide was stored in air having 85 percent relative humidity at 20° C, 61.5 percent of the aluminum phosphide was decomposed to hydrogen phosphide after 24 hours, 88 percent after 48 hours, 96 percent after 72 hours, and no undecomposed aluminum phosphide was detected after 7 days.

After gassing-out, the pesticide exhibited good solidity and did not powder.

EXAMPLE 2

A suspension of 224 parts by weight of aluminum phosphide having particle diameters between 5 and 600 microns, 50 parts by weight of polyvinyl chloride, and 60 parts by weight of dioctylphthalate was made in 40 parts by weight of white spirit. A fibrous fleece of cellulose having a thickness of 3 mm and a weight of 123 g/m² was coated on one side with this suspension to a thickness of 3 mm. The coated fleece was heated for 20 minutes at 190° C.

When the pesticide was stored in air having a 85 percent relative humidity at 20° C., 65 percent of the aluminum phosphide had decomposed to hydrogen phosphide after 24 hours, 90 percent after 48 hours, 98 percent after 72 hours, and no undecomposed aluminum phosphide was detected after 7 days.

The pesticide exhibited good solidity after gassing-out, and scarcely powdered.

EXAMPLE 3

54 Parts by weight of aluminum phosphide having particle diameters between 5 and 600 microns, 46 parts by weight of cellulose fibers, and 2.5 parts by weight of polystyrene were suspended in 1,080 parts by weight of trichloroethylene. The suspension was drawn off through a filter, and the residue was dried for 1 hour at 90° C. The obtained disc-shaped body had a diameter of 8 cm., a thickness of 16 mm, and a weight of 19.2 g.

When the body was stored in air having 85 percent relative humidity at 20° C., 80.2 percent of the aluminum phosphide had decomposed to hydrogen phosphide after 24 hours, 93.9 percent after 48 hours, and 97.0 percent after 72 hours.

The shaped body had good solidity after gassing out.

EXAMPLE 4

169 Parts by weight of aluminum phosphide having particle diameters between 5 and 600 microns, 20 parts by weight of cellulose fibers, 50 parts by weight of polyvinyl chloride, and 60 parts by weight of dioctylphthalate were suspended in 140 parts by weight of white spirit. The suspension was poured on to a glass plate to form a layer of 3 to 4 mm thickness and was heated for 20 minutes at 190° C. The layer was removed from the plate.

When the body was stored in air having 85 percent relative humidity at 20° C., 72 percent of the aluminum phosphide had decomposed to hydrogen phosphide after 24 hours, 85 percent after 48 hours, and 95 percent after 72 hours.

The shaped body had good solidity after gassing out, and powdered to only a slight extent.

EXAMPLE 5

54 Parts by weight of 90 percent finely distributed calcium cyanide, 46 parts by weight of cellulose fibers, and 2.5 parts by weight of polystyrene were suspended in 1,080 parts by weight of trichloroethylene. The suspension was drawn off through a filter, and the residue was dried for one hour at 90° C. The disc-shaped body obtained had a diameter of 8 cm., a thickness of 16 mm, and a weight of 19 g.

Gassing out was virtually complete after 48 hours.

The shaped body was solid after gassing out, and free from dust.

EXAMPLE 6

54 Parts by weight of aluminum phosphide of the above mentioned granular size, and 46 parts by weight of cellulose fibers were suspended in 900 parts by weight of methanol in which 2.5 parts by weight of urea had been dissolved. The suspension was drawn off through a filter, and the residue was dried for 1 hour at 60° C.

The gassing-out rate was the same as in Example 30 After gassing-out, the shaped body had the same very good solidity as before gassing-out, and did not powder.

EXAMPLE 7

The process was the same as in Example 3, with the exception that finely distributed aluminum phosphide was used whose separate particles were coated with a thin layer of hard paraffin.

The gassing-out rate was somewhat lower than in the case of the pesticide in Example 3. The gassed-out, shaped body had the same good solidity.

EXAMPLE 8

27 Parts by weight of aluminum phosphide of the above mentioned granular size, and 27 parts by weight of finely distributed 90 percent calcium cyanide were treated in accordance with Example 3 and a shaped body was manufactured as described in the latter Example.

The gassing-out rates of the separate decomposable constituents corresponded to the values according to Examples 3 and 5.

We claim:

1. A toxic gas-generating pest exterminator comprising a fibrous carrier having a porous web structure, and a polymeric plastic adhesive binding agent and anhydrous particles of decomposable toxic hydrogen cyanide or hydrogen phosphide gas-generating compounds finely distributed in said porous web structure, said porous web structure serving to allow access of moisture contained in the atmosphere to said finely distributed anhydrous particles of decomposable toxic hydrogen cyanide or anhydrous phosphide gas-generating compounds disposed therein with said polymeric plastic adhesive binding agent by anhydrous impregnation and drying, said fibrous carrier being packaged in an air-tight and moisture-proof container from which container desired metered quantities said fibrous carrier may be taken as required to gas out and thereby kill insects, rodents, and other pests in confined empty spaces, said toxic gaseous substances being generated by penetration of atmospheric moisture into said fibrous carrier causing decomposition of said distributed toxic gas-generating compounds, said fibrous carrier being made of plural flat structured fibrous web strip outer layers connected to each other with polymerized or polymerizable plastic adhesive binding agent to form a sandwich porous web structure, and wherein said porous web structure is cut into pieces or coiled into a roll adapted to be perforated at specific intervals in order to thereby provide desired quantities of said fibrous carrier.

2. The toxic gas-generating pest exterminator in accordance with claim 1 wherein a decomposable, toxic hydrogen cyanide gas-generating compound is disposed in said porous web structure.

3. The toxic gas-generating pest exterminator in accordance with claim 2 wherein the decomposable, toxic hydrogen gas-generating compound is calcium cyanide.

4. The toxic gas-generating pest exterminator in accordance with claim 1 wherein the decomposable, toxic hydrogen cyanide or hydrogen phosphide gas-generating compound is a member of the group consisting of calcium cyanide, magnesium phosphide, aluminum phosphide, and mixtures thereof.

5. The toxic gas-generating pest exterminator in accordance with claim 1 wherein the particle size of the decomposable compound contained in the pest exterminator is between 1 and 1,000 microns.

6. The toxic gas-generating pest exterminator in accordance with claim 1 wherein the pest exterminator contains up to 70 weight percent of the decomposable compound.

7. The toxic gas-generating pest exterminator in accordance with claim 1 wherein the binding agent is a member of the group consisting of polyvinyl chloride, polyurethane, polyester, polystyrene, and mixtures thereof.

* * * * *